Patented June 28, 1949

2,474,792

UNITED STATES PATENT OFFICE 2,474,792

POLYAMINO ALCOHOLS AND METHOD FOR PREPARING THEM

Murray Senkus, Terre Haute, Ind., assignor to Commercial Solvents Corporation, Terre Haute, Ind., a corporation of Maryland No Drawing. Application February 25, 1946,
Serial No. 650,135

9 Claims. (Cl. 260—338)

This invention relates to new and useful polyamino alcohols and to a method of preparing them. More particularly, it relates to new compounds having the structural formula:

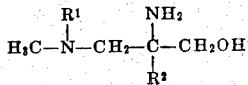

wherein $R^1$ is a member of the group consisting of alkyl and 3,5-dioxacyclohexyl, and $R^2$ is a member of the group consisting of hydrogen and alkyl; and to a method for preparing them.

As illustrative of some of the compounds coming within the scope of the above formula there may be mentioned: 3-dimethylamino-2-methyl-2-amino-1-propanol, 2-amino-2- methyl - 4 - (1 - methyl-3,5-dioxacyclohexyl) -4-aza - 1 - pentanol, 2-amino-2,4,5-trimethyl-4-aza-1-hexanol, 2-amino-4-methyl-4-aza-1-pentanol, and the like.

The new polyamines of my invention may be prepared by catalytically hydrogenating 5-nitrotetrahydro-1,3-oxazines in the liquid phase under pressure. Specifically, this process is effected by subjecting the aforesaid 5-nitrotetrahydro-1,3-oxazines to hydrogenation at normal or elevated temperatures in the presence of a suitable hydrogenation catalyst and a solvent at a temperature which may vary from about 25° to not substantially in excess of 100° C. In general, any hydogenation catalyst which is active within the aforesaid temperature range may be employed. For the majority of purposes, however, I have found it preferable to utilize Raney nickel. The hydrogenation reaction, in general, may be effected at hydrogen pressures ranging from about 500 pounds to about 3000 pounds pressure. I have found it preferable, however, to carry out such reactions at a pressure of approximately 1000 pounds per square inch and at temperatures of between about 25° and 70° C. Suitable solvents which may be utilized in the reduction step are the lower aliphatic alcohols such as methanol, ethanol, and the like.

After the reaction is complete, as may be evidenced by the failure of additional hydrogen absorption, the catalyst is separated from the reaction mixture by filtration and the solvent is distilled off and the resulting polyamino alcohol is recovered by rectification and further purified, if desired, by fractional distillation under high vacuum.

The 5-nitrotetrahydro-1,3-oxazines employed as starting materials for the production of the compounds of my invention are prepared by reacting equimolecular proportions of a suitable primary amine with a nitroparaffin having the nitro group attached to a primary carbon atom in the presence of formaldehyde, the latter being present in a molar ratio of about three to one of the nitroparaffin and one mole of the primary amine. A more detailed description of the methods by which such compounds can be prepared will be found in my co-pending application, U. S. Serial No. 650,134; filed February 25, 1946; now U. S. P. 2,447,822, issued August 24, 1948.

My invention may be further illustrated by the following specific examples.

Example 1

Eighty grams of 5-nitro-3-(1-methyl-3,5-dioxacyclohexyl) -5 - methyltetrahydro-1,3-oxazine, 900 ml. of methanol, and 10 grams of Raney nickel catalyst were placed in a suitable hydrogenation apparatus and hydrogenated at a pressure of approximately 1000 pounds per square inch at 100° C. for 2 hours. Rectification of the reduced solution gave 38 grams of 2-amino-2-methyl - 4 - (1 - methyl-3,5-dioxacyclohexyl) -4-aza-1-pentanol, boiling at 143–145° C. at 0.45 mm.

Example 2

One hundred twenty-three grams of crude 5-nitro-3,5-dimethyltetrahydro - 1,3 - oxazine were hydrogenated at 70° C. and 1000 pounds per square inch pressure for 2 hours in the presence of 15 grams of Raney nickel catalyst. Rectification of the reduced solution yielded 70 grams of 3-dimethylamino - 2 - methyl - 2 - amino-1-propanol, boiling at 58° C. at 0.3 mm.

Example 3

Three hundred twenty grams of 5-nitro-3-isopropyl-5-methyltetrahydro-1,3 - oxazine were hydrogenated for four hours at 40° C. and for 1 hour at 100° C. and 1000 pounds per square inch in 500 ml. of methanol in the presence of 10 grams of Raney nickel catalyst. Rectification of the reduced solution yielded 224 grams of 2-amino- 2,4,5-trimethyl-4-aza-1-hexanol, boiling at 78° C. at 0.25 mm., and at 96–98° C. at 0.9 mm.

The polyamino alcohols of my invention have been found to be useful in the preparation of numerous organic compounds. Other uses of these compounds will be apparent to those skilled in the art.

My invention now having been described, what I claim is:

1. As new compositions of matter, polyamino alcohols having the following structural formula:

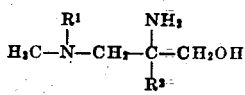

wherein $R^1$ is a member of the group consisting of alkyl and 3,5-dioxacyclohexyl, and $R^2$ is a member of the group consisting of hydrogen and alkyl.

2. 2-amino-2-methyl-4-(1-methyl-3,5-dioxacyclohexyl)-4-aza-1-pentanol.

3. 3-dimethylamino-2-methyl-2-amino-1-propanol.

4. 2-amino-2,4,5-trimethyl-4-aza-1-hexanol.

5. A process for the preparation of amino alcohols having the following structural formula:

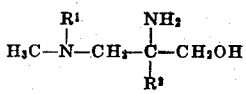

wherein $R^1$ is a member of the group consisting of alkyl and 3,5-dioxacyclohexyl, and $R^2$ is a member of the group consisting of hydrogen and alkyl, which comprises subjecting to catalytic hydrogenation, 5-nitrotetrahydro-1,3-oxazines having the following structural formula:

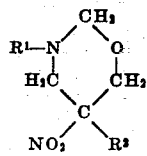

wherein $R^1$ and $R^2$ have their previously defined significances, in the liquid phase, in the presence of a Raney nickel catalyst at elevated pressure and elevated temperature.

6. A process for the preparation of amino alcohols having the following structural formula:

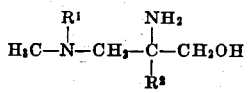

wherein $R^1$ is a member of the group consisting of alkyl and 3,5-dioxacyclohexyl, and $R^2$ is a member of the group consisting of hydrogen and alkyl, which comprises subjecting to catalytic hydrogenation, 5-nitrotetrahydro-1,3-oxazines having the following structural formula:

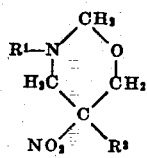

in the presence of an inert solvent of a Raney nickel hydrogenation catalyst at a temperature of from about 25 to about 100° C. and at a pressure of from about 500 to about 3000 pounds per square inch.

7. The process which comprises subjecting 5-nitro-3-(1-methyl-3,5-dioxacyclohexyl)-5-methyltetrahydro-1,3-oxazine to the action of hydrogen under conditions of high temperature and pressure in the presence of a Raney nickel catalyst and in the liquid phase, and recovering the resulting 2-amino-2-methyl-4-(1-methyl-3,5-dioxacyclohexyl)-4-aza-1-pentanol thereby produced.

8. The process which comprises subjecting 5-nitro-3,5-dimethyltetrahydro-1,3-oxazine to the action of hydrogen under conditions of high pressure and temperature in the presence of a Raney nickel catalyst and in the liquid phase, and recovering the resulting 3-dimethylamino-2-amino-1-propanol thereby produced.

9. The process which comprises subjecting 5-nitro-3-isopropyl-5-methyltetrahydro-1,3-oxazine to the action of hydrogen under conditions of high temperature and pressure in the presence of a Raney nickel catalyst and in the liquid phase, and recovering the resulting 2-amino-2,4,5-trimethyl-4-aza-1-hexanol thereby produced.

MURRAY SENKUS.

REFERENCES CITED

The following references are of record in the file of this patent:

UNITED STATES PATENTS

| Number | Name | Date |
|---|---|---|
| 1,973,647 | Nagai | Sept. 11, 1934 |
| 2,157,386 | Johnson | May 9, 1939 |
| 2,194,314 | Maxwell | Mar. 19, 1940 |
| 2,243,295 | Susie | May 27, 1941 |

FOREIGN PATENTS

| Number | Country | Date |
|---|---|---|
| 276,012 | Great Britain | Dec. 8, 1927 |

OTHER REFERENCES

Beilstein, "Handbuch Der Organischen Chemie," vol. III, page 736.